March 2, 1965    B. M. HILDEBRANT    3,171,612
SATELLITE ATTITUDE CONTROL MECHANISM AND METHOD
Filed Oct. 6, 1961    5 Sheets-Sheet 1
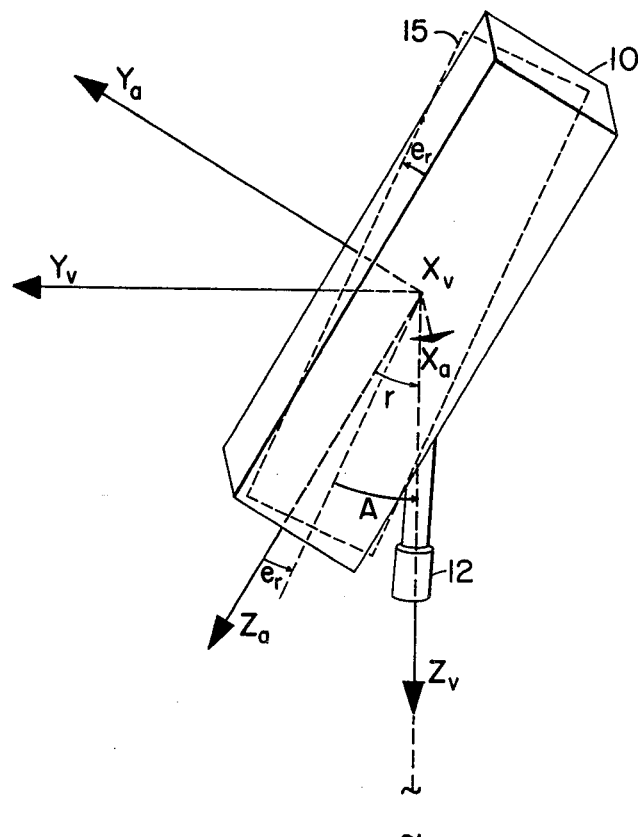
Fig. 1.
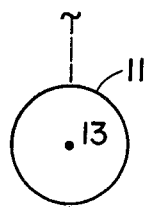
INVENTOR.
B. M. Hildebrant INVENTOR.
B. M. Hildebrant United States Patent Office 3,171,612
Patented Mar. 2, 1965

3,171,612
SATELLITE ATTITUDE CONTROL MECHANISM
AND METHOD
Benjamin M. Hildebrant, Westwood, Mass., assignor to
Massachusetts Institute of Technology, Cambridge,
Mass., a corporation of Massachusetts
Filed Oct. 6, 1961, Ser. No. 143,466
14 Claims. (Cl. 244—1)

This invention relates to a satellite attitude control mechanism and method.

Prior art systems for attitude control of an artificial satellite as represented by Patent 2,963,243 to H. C. Rothe, issued December 6, 1960, comprise a stable platform that is universally mounted on the vehicle and is of the general type that has been used in the guidance of ballistic missiles. This platform usually has a stabilizing gyroscope for each of the satellite's pitch, roll and yaw axes. When the space vehicle departs from its pre-determined position relative to the platform, an electrical signal is supplied to a mechanism which may comprise jet motors or motor-driven fly wheels for bringing the vehicle back to the desired attitude. A stable platform of this general character is disclosed in Patent 2,963,242, granted to F. J. Mueller, December 6, 1960. Since the stabilizing gyroscopes inherently have some drift, the position of the platform in space tends to change; and the resulting inaccuracy prevents efficient use of this known missile guidance mechanism in the attitude control of an orbiting space vehicle unless some means of supervision of the stabilizing gyroscopes is provided. A stable platform of the Mueller type tends to remain fixed in space; that is, its orientation relative to lines of sight to the fixed stars remains substantially constant and independent of the changing direction of the local vertical as the satellite orbits a planet. For certain applications, such as an orbiting astronomical observatory, it may be satisfactory for the satellite body also to maintain such a fixed attitude relative to the fixed stars. Usually, however, it is desired for a part of the satellite to point continuously "down" toward the center of the planet either to make observations of the planet or to communicate with it. To accomplish this, the satellite is not fixed in inertial space but must have a pitch rate equal to its orbital rate. In accordance with the prior art, a calculated orbital rate is injected into the stable platform mechanism, which commands the body not to be fixed in space but to rotate in the orbital plane at the orbital rate. Because of drift in gyroscopes and errors in the calculation of the orbital rate, some further means of supervision must be provided to maintain exact synchronism. Reference to the local vertical by means of horizon scanning apparatus is one such means of supervision, as described in the above mentioned Rothe patent. The above-mentioned Rothe patent teaches further that the vertical reference alone is sufficient for three-axis supervision of the stabilization system because of cross-coupling between yaw and roll motions in the rigid body dynamics of the vehicle.

In his analysis of the motion of the moon, Laplace demonstrated that a rigid body in circular orbit about a planet tends to orientate itself with its least principal axis of inertia passing through the center of the planet and its greatest principal axis of inertia normal to the orbital plane. Consequently, gravity acting on satellite body which is proportioned to point an antenna or telescope along the least principal axis of inertia of the body would tend to assume the desired vertical orientation without the aid of a stable platform, horizon scanners, and other such apparatus of the type as described in the above mentioned Rothe patent. Unfortunately, it is practically impossible to inject a satellite into orbit with precisely the correct orientation. The gravitational gradient force, or gravity torque $T_g$ is too weak quickly to stop any tumbling or oscillating. In time, tidal friction may cause the satellite to settle in one of its two stable orientations with one end or the other pointed to face the planet; however, the time needed for settling by tidal forces is unacceptably great. Moreover, for satellites of practical dimensions, the impact of micro-meteorites would tend to induce oscillations of unacceptable amplitude and a very slow rate of decay.

Accordingly, an object of this invention is to provide an improved stabilization system of a type taking advantage of the natural tendency of a satellite to orient itself with respect to the local vertical. Another object of the invention is to provide a satellite stabilized in three axes without the aid of a gyroscopically stabilized platform. Another object of the invention is to substantially simplify the stabilization of a satellite relative to the local vertical and its orbital plane. A further object of the invention is substantially to reduce the power required for stabilization of a satellite. A still further object of the invention is to provide a satellite having a long useful life by reason of improved reliability. A feature of the invention is a single degree of freedom gyroscope having its input, output, and spin axes oriented relative to the orbital plane and to the principal axes of inertia of the satellite body in such a way that torque between the gyroscope and the missile body tends to hold the body in the desired orientation in pitch, roll and yaw. Another feature is a support system which permits motion about the output axis as satellite orientation varies and which extracts energy from the motion to damp oscillations of the satellite. Another feature of the invention which is a consequence of the above features is that the least principal axis of inertia of the satellite body is inclined from the local vertical a predetermined amount. The foregoing and other objects of the invention may be apprehended from the following specification and the accompanying drawings in which:

FIG. 1 is a schematic view of a satellite in circular orbit as seen from a point in the orbital plane showing the relationship between the three principal axes of inertia of the satellite and the orbit;

Figure 2:
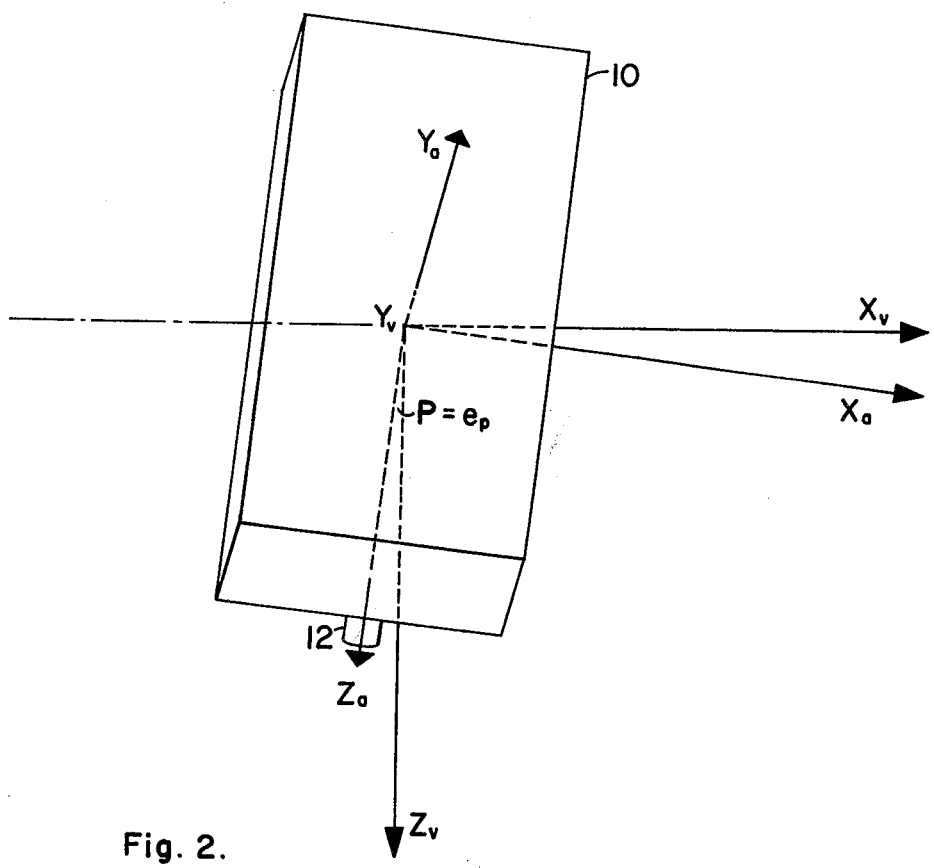
FIG. 2 is a schematic representation as in FIG. 1; but as viewed perpendicular to the orbital plane.

FIGURE 1 represents a satellite 10 in orbit about a planet 11. Subject to small position errors, a telescope 12 fixed to the satellite body 10 is pointed constantly toward the center 13 of the planet. The satellite is depicted as having a brick-like shape to emphasize the non-equality of its moments of inertia $I_x$, $I_y$, and $I_z$ about the three principal axes $X_a$, $Y_a$, $Z_a$ of inertia of the body. The external shape of the practical satellite is inconsequential to the practice of the invention. Forms which are basically spherical or cylindrical are possible; however, the distribution of mass within the body should be such that the moment of inertia $I_z$ about the least axis is substantially less than the moments $I_x$ and $I_y$ about the other two axes so that the separation of the center of gravity and center of mass is appreciable. If necessary, the effective mass distribution can be improved by extending a telescoping rod with a portion of the payload at each end of it. In FIG. 1 the frame of reference to which the vehicle is to be stabilized is designated by the axes $Z_v$, $X_v$, $Y_v$ of which $Z_v$ is the local vertical also defined as the yaw axis of the satellite. $X_v$ is horizontal in the plane of the orbit; for a circular orbit, it is also the roll axis of the satellite and lies along its direction of motion. Normal to these two vectors, the third coordinate $Y_v$, is opposite to the direction of the orbital angular velocity of the system $w_o$. The least principal axis of inertia $Z_a$ is substantially lengthwise; the greatest principal axis of inertia $Y_a$ is broadside. For the purpose of this specification the yaw angle $y$ of the satellite is defined as the angle in the $X_vY_v$ plane measured between $Y_v$ and the projection of $Y_a$ on the $X_vY_v$ plane. The roll angle $r$ is measured between the projection of the $Z_a$ axis on the $Y_vZ_v$ plane and the $Z_v$ axis; the pitch angle $p$ is measured in the $X_vZ_v$ plane between the projection of the $Z_a$ axis and the $Z_v$ axis.

For a body defined as non-rigid by reason of containing rotating parts, the minimum energy orbital orientation calls for certain pitch, roll and yaw angles which in general are non-zero. The gravity torque $T_g$ is, in such cases, also, in general, non-zero. In accordance with the present invention a gyroscope is mounted within the satellite body as described below, so that the equilibrium orbital orientation is as shown by the dotted outline 15. That is, pitch angle and yaw angle are both zero, roll angle is 30° more or less. Subject to disturbing influences, the satellite at any given instant may be out of alignment in pitch, roll and yaw as indicated by the pitch error angle, $e_p$, the yaw error angle, $e_y$, and the roll error angle, $e_r$. By reason of this misalignment, the telescope 12 deviates from the vertical by total error angle $e$. By reason of its orientation with least moment of inertia axis $Z_a$ inclined from the vertical, a gravitational torque $T_g$ acts on the satellite.

The magnitude of this torque is given by the equation:

$$T_g = \frac{3}{2}(I_y - I_z)w_o^2 \sin 2r \quad (1)$$

where:

$T_g$ is gravitational torque, in dyne centimeters
$I_y$ is the moment of inertia about the $Y_a$ axis, in gram centimeters squared
$I_z$ is the moment of inertia about the $Z_a$ axis, in gram centimeters squared
$w_o$ is the orbital rate in radians per second, and
$r$ is the roll angle in radians.

Figures 3, 3A:
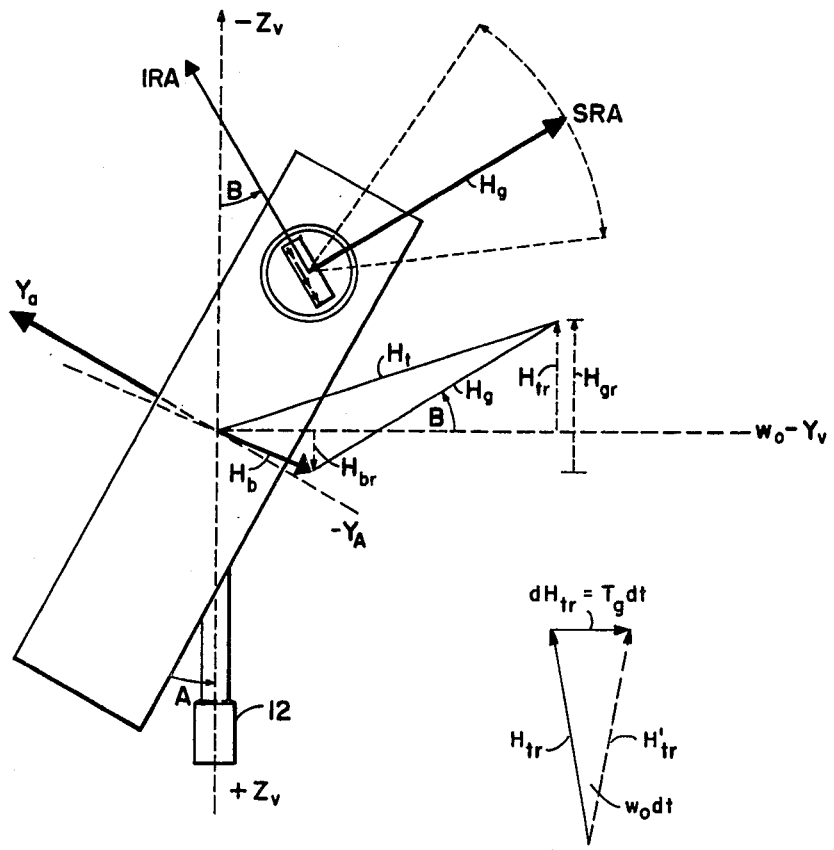
FIG. 3 is a cut-away close-up view of the satellite of FIG. 1 showing the orientation of the damping gyroscope within the satellite body, taken along the output axis of the gyro.
FIG. 3a is a vector analysis diagram, showing the relationship between the radial component of total angular momentum, orbital rate and gravitational torque.
Figure 4:
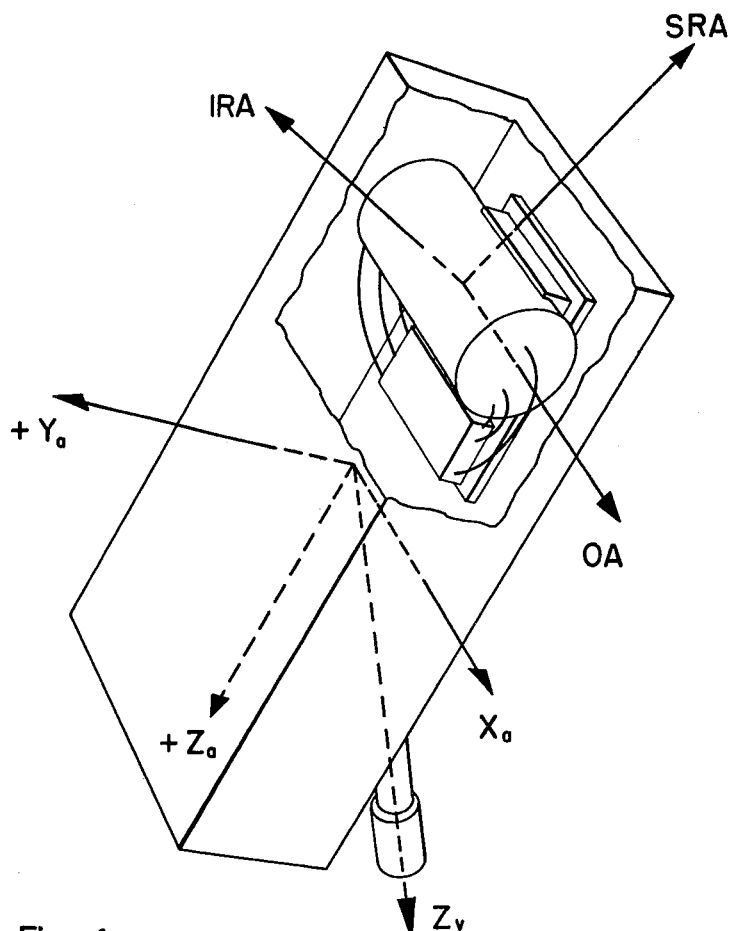
FIG. 4 is a perspective view of the apparatus of FIG. 3, showing elements of the gyroscopic apparatus and their relation to angular momentum vectors.
Figure 5:
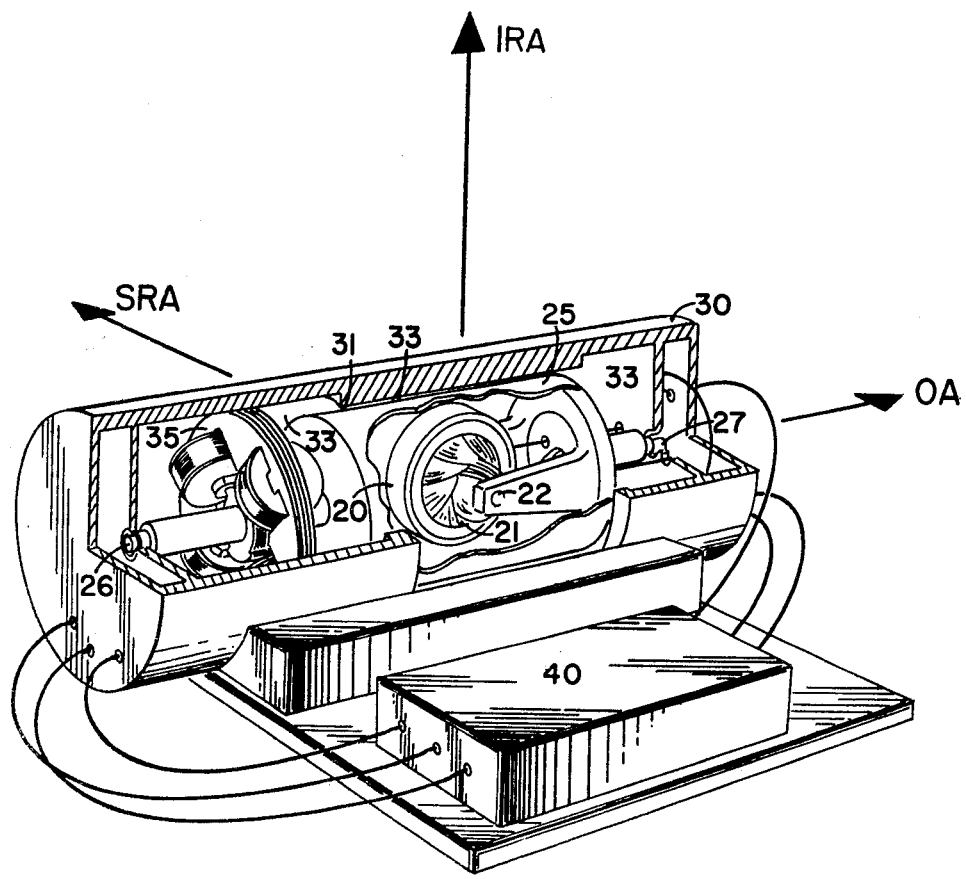
FIG. 5 is an enlarged view of the gyroscopic apparatus of FIG. 4.

To maintain the particular vehicle attitude (with a steady-state roll angle A) as shown in FIGS. 1 and 2, the gyroscope is installed within the missile as shown in FIGS. 3, 4 and 5. Its output axis OA is parallel with the intermediate principal axis of inertia $-X_a$. The spin reference axis SRA is in the $Y_aZ_a$ plane making an angle $(A+B)$ with the $-Y_a$ axis. The input reference axis IRA, also in the $Z_a$, $Y_a$ plane, is perpendicular to spin reference axis SRA and output axis OA, and is directed largely upward. The spin reference axis angle $(A+B)$, the steady-state roll angle A, the angular momentum $H_b$ of the body and the angular momentum $H_g$ of the wheel 20 are selected as explained below so that the total angular momentum $H_t$ of the system is constant in magnitude, perpendicular to gravity torque and precessed by gravity torque in a cone at orbital rate $w_o$.

Although other types of gyroscopes may be used to practice the invention, it is preferred to employ a gyroscope of general type described in the Draper Patent 2,752,490 issued Aug. 2, 1951, modified in that no signal generator is required (although one might be useful for adjustment and monitoring the system). A wheel 20 is provided with electromagnetic means 21 for spinning it about the spin axis on ball bearings 22 within a float and gimbal 25 which is constrained by bearings 26, 27 to rotate between stops about an output axis OA perpendicular to the spin reference axis SRA within a case 30. The case 30 and float 25 are proportioned to leave between them a thin uniform circumferential damping gap 31. The space between the case and float is filled with a suitable fluid 33, the viscous shear of which provides the desired degree of damping of motion about the output axis. Oscillatory motion of the satellite is damped out by the dissipation of energy in the viscous resistance of the damping fluid.

In addition to damping forces a steady torque must be applied between the gyroscope and the body to hold the steady roll angle A. The required torque on the output axis (which is typically of the order of a few hundred dyne-centimeters) is preferably applied by means of a torque generating device 35 of the type described in R. K. Mueller Patent 2,630,561, issued March 3, 1953. The necessary steady-state excitation current for the torque generator is supplied by the current generator 40 which may comprise a transistor oscillator or other well known means for generating alternating current. Generator 40 also supplies power for rotation to the means 21. The maintenance of a steady-state roll angle requires that certain relations hold between the angular momentum vectors of the system. In this condition there is a steadily applied gravitational torque $T_g$. This torque acting on the total angular momentum $H_t$ of the satellite causes a rate of change of angular momentum proportional to the torque. Since a steady-state is desired, the magnitude of the momentum must remain constant, change being restricted to direction. Accordingly, the reaction of the system to transient torques is a precession in a direction such that the total torques on the system are applied parallel to the roll axis, and total angular momentum vector is constrained to the $Y_vZ_v$ plane wherein it is resolvable into radial and horizontal components. The angular momentum of the body $H_b$ as shown in FIG. 3 necessarily tilts away from the $w_o$ direction as the vehicle rolls. For a vehicle proportioned to have its least principal moment of inertia $I_z$ much less than greatest principal moment of inertia $I_y$, the momentum $H_b$ does not depart far from the direction which is perpendicular to both the least principal axis of inertia $Z_a$ and the roll axis $X_v$. In FIG. 3, which is typical, it is inclined a few degrees from the $-Y_a$ axis in the direction of $w_o$ and $-Y_v$. The radial component $H_{br}$ of the body angular momentum is given by the relation:

$$H_{br} = \frac{1}{2}(I_y - I_z)w_o \sin 2A \quad (2)$$

The torque $T_{br}$ resisting precession of this vector $H_{br}$ at orbital rate is given by:

$$T_{gbr} = \frac{1}{2}(I_y - I_z)w_o^2 \sin 2A \quad (3)$$

which bears a remarkable similarity to Equation 1.

FIG. 3a illustrates the relationship that must exist between the radial component $H_{rt}$ of the total angular momentum $H_t$ of the system, the orbital rate $w_o$, and the gravitational torque $T_g$. The vector $H_{tr}$ represents the component at one instant of time. An instant $dt$ later, the vector rotates to the position of the vector $H_{tr}{}^1$. The change in momentum $dH_{tr}$ is equal to the torque $T_g$ multiplied by the time $dt$. The resulting angle is the angle turned at orbital rate $w_o$ in the same time $dt$. Thus:

$$\frac{T_g dt}{H_{tr}} = w_o dt \quad (4)$$

The required vertical component $H_{tr}$ of angular momentum is given by:

$$H_{tr} = T_g / w_o \quad (5)$$

Note that the required vertical component $H_{tr}$ of total angular momentum is opposite in sign and three times the magnitude of the vertical component $H_{br}$ of the body.

$$H_{tr} = -3H_{br} \quad (6)$$

Thus, for equilibrium, the total angular momentum of the satellite, measured with gyro wheels at rest, must be altered by the spinning of a gyro wheel or wheels which are so proportioned and oriented that the vertical component $H_{gr}$ of the gyroscope angular momentum is opposite in direction to the vertical component $H_{br}$ of the angular momentum of static parts and has four times the amplitude. Then:

$$H_{br}+H_{gr}=H_{tr}=T_g/w_o \tag{7}$$

It has been found that for three-axis stabilization, damping is most effective when the roll angle is about 30 degrees. Thus the required gyroscope angular momentum is of the order of two to five times the vehicle angular momentum. For vehicles weighing of the order of 100 kilograms, and at orbital rates of the order of $3\times10^{-4}$ radians per second (corresponding to an altitude of about 6,000 miles) the required gyroscope angular momentum is of the order of one million grams-centimeters squared ($10^6$ g. cm.²).

It will be recognized that this is a reasonable figure for the angular momentum of a gyroscope of quite small proportions. The torque $M_g$ which must be exerted between the gyro float and the vehicle is given by the relation:

$$M_g=H_{gr}w_o \tag{8}$$

or $$M_g=H_g w_o \sin B \tag{9}$$

The required torque for a satellite of the size just described amounts to a few hundred dyne-centimeters. This magnitude of torque can be generated and controlled within close limits by the torque generators of the type disclosed in the above mentioned R. K. Mueller patent. For greatest precision these devices may be improved as disclosed in the copending application of G. E. Garcia Serial No. 740, filed January 6, 1960.

Other forms of torque generators including springs and permanent magnet devices may be employed in the gyroscope device as is well known in the art.

It will be recognized that in its broader aspects this invention may be applied to space craft of different types intended for different tasks. The preferred embodiment of the invention is in a communications satellite of the type proposed by the American Telephone and Telegraph Company. In the Telephone company's proposed system, 30 to 50 active repeater satellites are randomly distributed in polar orbits at an altitude of between 4,000 and 6,000 nautical miles. At this altitude the earth subtends an angle ranging between about 50 degrees to about 60 degrees. The satellite is equipped to communicate by sending or receiving with stations located anywhere on the portion of the earth's surface which is within line-of-sight. Accordingly antenna beam widths of the order of 60 degrees are contemplated. For such a system, yaw stabilization is unnecessary and no substantial loss in system capacity results from pitch and roll error angles $e_p$ and $e_r$ of the order of five degrees. It will also be recognized that traffic patterns will be changed continuously as the relative locations of the numerous satellites change by reason of small differences in their orbits. In general, the reliability of the system will be protected by a substantial redundancy. This redundancy can compensate for failure of any system element for any of many reasons.

One of the reasons for temporary loss of one satellite might be a large error angle introduced by non-fatal collision with a micrometeorite. The settling time of this system is several hours. The excess rotational energy absorbed in collision is dissipated in the damping fluid 33 of the gyroscope. The required damping forces have been shown by analog computer simulation studies to be in the range conveniently obtained by viscous fluids. The precise viscosity required for optimum settling time for a particular satellite design is best determined by trial and error using analog computer simulation techniques.

Another feature of this system is that it is bistable, that is, the satellite may settle from a tumbling condition with the antenna or telescope pointing upward just as well as with it pointed downward. The force system of FIG. 3 applies as well with the satellite rotated 180 degrees about $w_o$. In that case the body angular momentum $H_b$ has an upward component $H_b$ while the required total angular momentum which is acted upon by oppositely directed gravity torque must have a downward component which in the inverted position, the gyroscope can supply.

The satellite must be equipped to accommodate this bistability. For example, it might have a second antenna pointed opposite to the first. Preferably it is equipped with a "flipper." The "flipper" is connected to actuate whenever a day passes without communications activity. It consists of a small high speed electric motor with gear train to activate cam-operated switches. The spin axis of the motor is oriented horizontally at the angle A relative to the $X_a$ axis where it is parallel to the $Y_v$ axis in either stable position of the satellite. When activated, the motor rapidly turns a predetermined number of revolutions and stops. The body turns one-half turn opposite. The number of half-turns of the motor is approximately equal to the ratio of the moment of inertia of the body to the moment of inertia of the motor armature and gear train related to armature speed. Preferably the "flipper" should pitch the satellite forward, i.e. cause a momentary increase in body angular rate. For this, the armature angular velocity must be opposite to orbital angular velocity $w_o$. With this arrangement, the gyroscope precesses its SRA into coincidence with $w_o$ and exerts a minimum influence on the flipping maneuver.

The invention has been described in particularity with respect to the preferred embodiment as a communications satellite. Other variations and modifications of the invention will be apparent to those skilled in the art. The optimum arrangement for a particular mission being ascertainable by appropriate computer simulation.

One particular modification may be noted, namely the modification in which the steady-state attitude of the satellite is defined by pitch and roll angles of zero with a constant yaw offset angle. In this configuration, there is no gravity torque. Therefore, the total angular momentum $H_t$ must be coincident with the orbital rate $w_o$. By reason of the yaw angle and the inequality of $I_x$ and $I_y$, the body angular momentum in this orientation lies in the $X_vY_v$ plane and has a lateral component $H_{bl}$. The orientation of the damping gyro which is required for this arrangement is with the spin axis in the $X_vY_v$ plane, having a component of angular momentum in the direction of the orbital angular momentum $w_0$ and a lateral component $H_{gl}$ equal and opposite to the lateral component $H_{bl}$ of the body angular momentum $H_b$. With this arrangement, both the required gyroscope angular momentum and the required torque motor torques are much less in comparison to the size of the vehicle than in the case of a roll angle offset. This alternative system might be preferable to the roll-offset case for a satellite of somewhat greater size and having configuration giving large differences in the principal moments of inertia and a large ratio of moment of inertia to micrometeorite collision cross section.

Having thus described the invention what is claimed as new is:

1. A space vehicle for operating in near orbit about a planet comprising a rigid body having a least principal moment of inertia axis and a greatest principal moment of inertia axis perpendicular to said least axis, said body including means for receiving radiation from said planet having a directivity pattern of maximum sensitivity in a direction lying in the plane determined by said least and said greatest axes making with said least axis an acute angle, a gyroscope wheel mounted in a single degree of freedom gimbal on said body with its output axis perpendicular to said least axis and spin axis in the plane determined by said least and greatest axes, the angular momentum of said wheel having such magnitude and direction that the vertical component of said wheel momentum is opposite in direction and four times the magnitude of the vertical component of the angular momentum of said body measured with said least axis rolled from the vertical by the amount of said acute angle, a viscous damper restraining said gimbal and means for applying between said gimbal and said body a substantially constant torque.

2. In a space vehicle for operating in near orbit about a planet which comprises a rigid body having a least principal moment of inertia axis and a greatest principal moment of inertia axis perpendicular to said least axis, an attitude damping system comprising a gyroscope wheel mounted in a single degree of freedom gimbal on said body with its output axis perpendicular to said least axis, a spin axis in the plane determined by said least and greatest axes, the angular momentum of said wheel having such magnitude and direction that the vertical component of said wheel momentum is opposite in direction and four times the magnitude of the vertical component of the angular momentum of said body when said least axis is inclined at a predetermined acute roll angle, a viscous damper restraining said gimbal and means for applying between said gimbal and said body a substantially constant torque.

3. A space vehicle for operating in near orbit about a planet comprising a rigid body having a least principal moment of inertia axis and a greatest principal moment of inertia axis perpendicular to said least axis, said body including means for receiving radiation from said planet having a directivity pattern of maximum sensitivity in a direction lying in the plane determined by said least and said greatest axes making with said least axis an acute angle, a gyroscope wheel mounted in a gimbal on said body with its output axis perpendicular to said least axis and spin axis in the plane determined by said least and greatest axes, the angular momentum of said wheel having such magnitude and direction that the vertical component of said gyroscope momentum is opposite in direction and four times the magnitude of the vertical component of the angular momentum of said body measured with said least axis rolled from the vertical by the amount of said acute angle, a viscous damper restraining said gimbal, means for applying between said gimbal and said body a substantially constant torque, and a flipper.

4. The combination consisting of a rigid body having a least principal moment of inertia axis and a greatest principal moment of inertia axis perpendicular to said least axis, and a gyroscope having a wheel mounted in a gimbal within a case fixed in said body with its output axis perpendicular to said least axis, its spin axis in the plane determined by said least and greatest axes and with the quotient of the angular momentum of said wheel at operating speed divided by the greatest principal moment of inertia of said body in excess of twenty seconds of arc per second of time, and having damping means for applying torque between said gimbal and said case.

5. In combination a rigid body having a least principal moment of inertia axis and a greatest principal moment of inertia axis perpendicular to said least axis, a gyroscope wheel mounted in a single degree of freedom gimbal on said body with its output axis perpendicular to said least axis, a spin axis in the plane determined by said least and greatest axes, a viscous damper restraining said gyroscope and means for applying between said gimbal and said body a substantially constant torque.

6. A communications satellite comprising a rigid body having a least principal moment of inertia axis, a greatest principal moment of inertia axis perpendicular to said least axis and an intermediate principal moment of inertia axis perpendicular to each of said axes, a part of said body being a communications antenna having a directivity pattern of maximum sensitivity in a direction lying in the plane determined by said least and said greatest axes making with said least axis a predetermined angle of between 20° and 45°, a gyroscope wheel mounted in a single degree of freedom gimbal on said body with its output axis parallel to said intermediate axis, a spin reference axis in the plane determined by said least and greatest axes at an angle $(A+B)$ relative to said greatest axis, the angles A and B being determined by the equation:

$$H_g \sin B = 2(I_y - I_z)\omega_0 \sin 2A$$

where $H_g$ is the angular momentum of said wheel, A is said predetermined angle, $I_y$ is the principal moment of inertia of said body about said greatest axis, $I_z$ is the principal moment of inertia of said body about said least axis, and $w_0$ is the satellite orbital angular velocity, a viscous damper restraining said gimbal, and means for applying between said gimbal and said body a substantially constant torque.

7. A communications satellite comprising a rigid body having a least principal moment of inertia axis, a greatest principal moment of inertia axis perpendicular to said least axis and an intermediate principal moment of inertia axis perpendicular to each of said axes, a part of said body being a communications antenna having a directivity pattern of maximum sensitivity in a direction lying in the plane determined by said least and said greatest axes making with said least axis a predetermined acute angle, a gyroscope wheel mounted in a gimbal on said body with its output axis parallel to said intermediate axis, a spin axis in the plane determined by said least and greatest axes at an angle $(A+B)$ relative to said greatest axis, the angles A and B being determined by the equation $$H_g \sin B = 2(I_y - I_z) w_0 \sin 2A$$

where $H_g$ is the angular momentum of said wheel, A is said predetermined angle, $I_y$ is the principal moment of inertia of said body about said greatest axis, $I_z$ is the principal moment of inertia of said body about said least axis, and $w_0$ is the satellite orbital angular velocity, a viscous damper restraining said gyro, and means for applying between said gimbal and said body a substantially constant torque.

8. A satellite comprising a rigid body having a least principal moment of inertia axis and a greatest principal moment of inertia axis perpendicular to said least axis and an intermediate principal moment of inertia axis perpendicular to each of said axes a gyroscope wheel mounted in a gimbal on said body with its output axis parallel to said intermediate axis, a spin axis in the plane determined by said least and greatest axes at an angle $(A+B)$ relative to said greatest axis, the angles A and B being determined by the equation:

$$H_g \sin B = 2(I_y - I_z) w_0 \sin 2A$$

where $H_g$ is the angular momentum of said wheel, A is a predetermined roll angle, $I_y$ is the principal moment of inertia of said body about said greatest axis, $I_z$ is the principal moment of inertia of said body about said least axis, and $w_0$ is the satellite orbital angular velocity, a viscous damper restraining said gimbal, and means for applying between said gimbal and said body a substantially constant torque.

9. A satellite comprising a rigid body having a least principal moment of inertia axis, and a greatest principal moment of inertia axis perpendicular to said least axis and an intermediate principal moment of inertia axis perpendicular to each of said axes a gyroscope wheel mounted in a gimbal on said body with its output axis parallel to said intermediate axis, a spin reference axis in the plane determined by said least and greatest axes at an angle $(A+B)$ relative to said greatest axis, the angles A and B being determined by the equation:

$$H_g \sin B = 2(I_y - I_z) w_0 \sin 2A$$

where $H_g$ is the angular momentum of said wheel, A is a predetermined roll angle between 20 degrees and 45 degrees, $I_y$ is the principal moment of inertia of said body about said greatest axis, $I_z$ is the principal moment of inertia of said body about said least axis, and $w_0$ is the satellite orbital angular velocity, a viscous damper restraining said gimbal, and means for applying between said gimbal and said body a substantially constant torque.

10. A satellite comprising a rigid body having at least principal moment of inertia axis, a greatest principal moment of inertia axis perpendicular to said least axis and an intermediate principal moment of inertia axis perpendicular to each of said axes, and having a directivity pattern of maximum sensitivity to radiation in a direction lying in the plane determined by said least and said greatest axes making with said least axis a predetermined acute angle, a gyroscope wheel mounted in a single degree of freedom gimbal on said body with its output axis parallel to said intermediate axis, a spin reference axis in the plane determined by said least and greatest axes at an angle $(A+B)$ relative to said greatest axis, the angles A and B being determined by the equation:

$$H_g \sin B = 2(I_y - I_z) w_0 \sin 2A$$

where $H_g$ is the angular momentum of said wheel, A is said predetermined angle, $I_y$ is the principal moment of inertia of said body about said greatest axis, $I_z$ is the principal moment of inertia of said body about said least axis, and $w_0$ is the satellite orbital angular velocity, a viscous damper restraining said gimbal, and means for applying between said gimbal and said body a substantially constant torque.

11. A method of stabilizing the attitude of a space vehicle in orbit around a planet which comprises adjusting the mass distribution within the satellite so that the desired vertical direction through the center of mass of the vehicle lies in the plane determined by the least principal axis of inertia of the vehicle and the greatest principal axis of inertia of the vehicle at an acute angle with said least axis and so that the desired roll axis of said vehicle is perpendicular to said plane, spinning within said body inertial elements of sizes at rates and in directions such that the vector sum of the angular momentum contributions of such elements when added to the vector orbital angular momentum of the vehicle shall constitute a total angular momentum vector which, in the steady state, is perpendicular to the direction of satellite motion with a component parallel to the orbital angular velocity vector and a vertical component opposite in direction and of magnitude thrice that of the vertical component of said vector orbital angular momentum, and resisting the rotation of one said element about an axis perpendicular to said plane substantially by a torque which is the sum of a constant term and a term which is substantially proportional to the rate of rotation of said element about said axis perpendicular to said plane.

12. A method of stabilizing the attitude of a space vehicle in orbit around a planet which comprises adjusting the mass distribution within the satellite so that the desired vertical direction through the center of mass of the vehicle lies in the plane determined by the least principal axis of inertia of the vehicle and the greatest principal axis of inertia of the vehicle at an acute angle with said least axis and so that the desired roll axis of said vehicle is perpendicular to said plane, spinning within said body a gyroscope wheel gimballed in said body with its output axis perpendicular to said plane adjusting the vector angular momentum of said wheel so that when combined with the vector orbital angular momentum of the vehicle the sum which is the total angular momentum vector is perpendicular in the steady state to the direction of satellite motion with a component parallel to the orbital angular velocity vector and a vertical component opposite in direction and of magnitude thrice that of the vertical component of said vector orbital angular momentum, and resisting the gimbal support of said wheel about an axis perpendicular to said plane by a torque which is the sum of a constant term and a term which is substantially proportional to the rate of rotation of said wheel about said axis perpendicular to said plane.

13. A method of stabilizing the attitude of a space vehicle in orbit around a planet which comprises adjusting the mass distribution within the satellite so that the desired vertical direction through the center of mass of the vehicle lies in the plane determined by the least principal axis of inertia of the vehicle and the greatest principal axis of inertia of the vehicle at an acute angle with said least axis and so that the desired roll axis of said vehicle is perpendicular to said plane, spinning within said body inertial elements of sizes at rates and in directions such that the vector sum of the angular momentum contributions of such elements when added to the vector orbital angular momentum of the vehicle shall constitute a total angular momentum vector which, in the steady state, is perpendicular to the direction of satellite motion with a component parallel to the orbital angular velocity vector and a vertical component opposite in direction and of magnitude thrice that of the vertical component of said vector orbital angular momentum, and damping the rotation of one said element about an axis perpendicular to said plane.

14. A method of stabilizing the attitude of a space vehicle in orbit around a planet which comprises adjusting the mass distribution within the satellite so that the desired roll axis through the center of mass of the vehicle lies in the plane perpendicular to the least principal axis of inertia of the vehicle and the greatest principal axis of inertia is at an acute angle with said roll axis and so that the desired vertical direction through said center is perpendicular to said plane, spinning within said body inertial elements of sizes at rates and in directions such that the vector sum of the angular momentum contributions of such elements when added to the vector orbital angular momentum of the vehicle shall constitute a total angular momentum vector which, in the steady state, is parallel to the orbital angular velocity vector and damping the rotation of one said element about an axis perpendicular to said plane.

No references cited.

FERGUS S. MIDDLETON, *Primary Examiner.*

CHESTER L. JUSTUS, RALPH D. BLAKESLEE,
*Examiners.*